(12) United States Patent
Yamakawa et al.

(10) Patent No.: US 8,607,589 B2
(45) Date of Patent: Dec. 17, 2013

(54) METHOD AND APPARATUS FOR ANNEALING GLASS PLATE

(75) Inventors: Hiroshi Yamakawa, Chiyoda-ku (JP); Akira Sugahara, Chiyoda-ku (JP); Yasumasa Kato, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/562,921

(22) Filed: Jul. 31, 2012

(65) Prior Publication Data

US 2012/0291490 A1 Nov. 22, 2012

Related U.S. Application Data

(63) Continuation of application No. PCT/JP2011/052173, filed on Feb. 2, 2011.

(30) Foreign Application Priority Data

Feb. 3, 2010 (JP) ................................ 2010-022120

(51) Int. Cl.
 *C03B 25/08* (2006.01)
 *C03B 25/12* (2006.01)

(52) U.S. Cl.
 USPC ........................................ 65/95; 65/93; 65/94

(58) Field of Classification Search
 USPC ........................................ 65/90–95
 See application file for complete search history.

(56) References Cited

U.S. PATENT DOCUMENTS

| 3,365,285 | A | * | 1/1968 | Richardson | 65/104 |
| 3,522,029 | A | * | 7/1970 | Carson et al. | 65/104 |
| 3,554,724 | A | * | 1/1971 | Ritter et al. | 5/107 |
| 4,212,662 | A | * | 7/1980 | Brereton et al. | 65/106 |
| 4,515,622 | A | * | 5/1985 | McMaster et al. | 65/351 |
| 5,028,202 | A | * | 7/1991 | Katada et al. | 414/783 |
| 5,071,461 | A |   | 12/1991 | Hirotsu et al. | |
| 5,127,932 | A | * | 7/1992 | Aratani | 65/114 |

(Continued)

FOREIGN PATENT DOCUMENTS

| JP | 5-58658 A | 3/1993 |
| JP | B-7-29793 | 4/1995 |

(Continued)

OTHER PUBLICATIONS

U.S. Appl. No. 13/566,001, filed Aug. 3, 2012, Kato, et al.

(Continued)

*Primary Examiner* — Jodi C Franklin
(74) *Attorney, Agent, or Firm* — Oblon, Spivak, McClelland, Maier & Neustadt, L.L.P.

(57) ABSTRACT

A method and an apparatus for annealing a glass sheet, which can sufficiently reduce I/T formed in the glass sheet, are provided. In the method for annealing a glass sheet G of the present invention, in a state that a heated and bent glass sheet G is placed on a forming mold 16, first, a region of the glass sheet G to be lifted up is cooled by cooling devices 20, 22, to make the temperature of the region to be lifted up to be a temperature of at most the strain point. Next, in this state, a lift-up member 36 is operated to lift up the region of the glass sheet G to be lifted up, by rods 38, to separate the glass sheet G from the forming mold 16.

12 Claims, 8 Drawing Sheets

(56) References Cited

U.S. PATENT DOCUMENTS

| | | | |
|---|---|---|---|
| 5,135,557 A * | 8/1992 | Petitcollin et al. | 65/104 |
| 5,139,552 A * | 8/1992 | Yoshizawa et al. | 65/273 |
| 5,302,176 A * | 4/1994 | Shibuya et al. | 65/106 |
| 5,346,526 A * | 9/1994 | Flaugher et al. | 65/273 |
| 5,380,575 A * | 1/1995 | Kuster et al. | 428/98 |
| 5,876,477 A * | 3/1999 | Bennett et al. | 65/273 |
| 5,938,810 A * | 8/1999 | De Vries et al. | 65/268 |
| 6,015,619 A * | 1/2000 | Schnabel et al. | 428/410 |
| 6,094,943 A * | 8/2000 | Okuda et al. | 65/114 |
| 6,656,597 B2 * | 12/2003 | Takahara | 428/432 |
| 6,986,268 B2 * | 1/2006 | Lee | 65/95 |
| 8,074,473 B2 * | 12/2011 | Nitschke et al. | 65/114 |
| 2002/0106519 A1 * | 8/2002 | Takahara | 428/426 |
| 2003/0094017 A1 | 5/2003 | Matsuo et al. | |
| 2003/0230116 A1 * | 12/2003 | Yli-Vakkuri | 65/273 |
| 2004/0007022 A1 * | 1/2004 | Tominaga et al. | 65/114 |
| 2004/0098946 A1 | 5/2004 | Meerman | |
| 2005/0044896 A1 * | 3/2005 | Frank et al. | 65/273 |
| 2005/0266247 A1 * | 12/2005 | Yoshizawa | 428/410 |
| 2005/0268661 A1 * | 12/2005 | Yoshizawa et al. | 65/103 |
| 2008/0096026 A1 * | 4/2008 | Yamada et al. | 428/426 |
| 2008/0127678 A1 * | 6/2008 | Nitschke et al. | 65/29.1 |
| 2010/0050694 A1 * | 3/2010 | Dajoux et al. | 65/106 |

FOREIGN PATENT DOCUMENTS

| | | |
|---|---|---|
| JP | A-11-11989 | 1/1999 |
| JP | 2002-234756 A | 8/2002 |
| JP | 2002-308635 A | 10/2002 |
| JP | 2004-508995 A | 3/2004 |
| JP | 2005-343720 A | 12/2005 |

OTHER PUBLICATIONS

International Search Report issued Apr. 5, 2011 in PCT/JP2011/052173 filed Feb. 2, 2011 (in English).

* cited by examiner

METHOD AND APPARATUS FOR ANNEALING GLASS PLATE

TECHNICAL FIELD

The present invention relates to a method and an apparatus for annealing a glass sheet, in particular, to a method and an apparatus for annealing a glass sheet in a high-temperature state, that is heated and bent, in a production of a glass sheet constituting a laminated glass.

BACKGROUND ART

A laminated glass is a glass formed by bonding two glass sheets with a plastic interlayer made of e.g. PVB (polyvinyl butyral) interposed between them, and such a laminated glass is used as a windshield as well as a door glass of an automobile. This type of laminated glass is formed into a curved shape from the viewpoint of a body line and design of an automobile.

As the method for bending a glass sheet to be employed for a laminated glass, there is a method of placing a flat-plate shaped glass sheet on a forming mold having a bending-forming surface corresponding to a desired curved shape, and the forming mold is conveyed into a heating furnace, thereby to heat the glass sheet into the vicinity of the glass-softening point in the heating furnace. In this forming method, since the glass sheet is softened to be bent along the bending-forming surface of the forming mold by gravity, a glass sheet having a desired curved surface is produced. Further, as another bending method, a method of pressing a glass sheet heated and placed on a forming mold from upper side by a pressing means to bend the glass sheet, is also known.

A laminated glass for an automobile is fixed as it is fitted to a frame of an automobile, and at this time, in order to avoid breakage of the laminated glass, a plane compressive stress (hereinafter in this specification, a plane compressive stress formed at the edge of a glass sheet is referred to as edge compression, and it is abbreviated to as E/C) is formed at the edge of the glass sheet. In the glass sheet in which a residual stress is formed, a surface compressive stress is formed on the surface and an inner tensile stress is formed inside in the cross-sectional direction of the glass sheet. The plane residual stress is defined as follows. Namely, it is an integral value of the surface compressive stress and the inner tensile stress integrated along the cross-sectional direction of a glass sheet, and when the surface compressive stress is larger, the plane residual stress becomes a plane compressive stress. A region adjacent to the region of plane compressive stress, becomes a region of plane tensile stress wherein inner tensile stress is larger so as to balance with the plane compressive stress. Right inside from the edge, in order to balance with E/C, a plane tensile stress (hereinafter, in this specification, a plane compressive stress formed in a region just inside the edge of a glass sheet is referred to as inner tension, and it is hereinafter abbreviated to as I/T) is formed along the edge. This I/T has a peak in a peripheral region within about 50 mm inside from the edge of the glass sheet. When E/C is large, of course I/T is also large. A large plane tensile stress indicates that the plane tensile stress layer in this portion of the glass sheet is thin in the cross-sectional direction, and accordingly, the peripheral portion is a portion that tends to be destroyed as compared with the edge or the internal portion.

In a conventional laminated glass, since the edge and the peripheral portion of the glass sheet is covered with e.g. a mole made of a resin, there has not been a problem even if a certain degree of large I/T is formed. However, in a flash mount structure (that is a structure of fixing a laminated glass so that the body surface and the glass surface share a substantially the same plane) that is required as an automobile design, since the peripheral portion is exposed to the car-exterior side, it is required to reduce I/T.

Further, in recent years, from a demand for reducing weight of an automobile or from the viewpoint of safety of a passenger at a time of collision, component glass sheets each having a relatively small thickness of from about 1.5 to 3.2 mm are employed for a laminated glass. In order to fit such thin glass sheets to an automobile body by using a flash mount structure without breaking the glass sheets, it is necessary to prepare glass sheets having sufficiently large E/C and sufficiently small I/T. According to the knowledge of the present inventors, E/C is preferably at least 8 MPa, more preferably at least 10 MPa, and UT is preferably at most 3 MPa, more preferably at most 2.4 MPa.

Patent Document 1 being a prior art document discloses an annealing method of suitably annealing the edge of a glass sheet that has been bent by employing a ring-shaped forming mold. This annealing method is a method of lifting up a glass sheet, that has been bent by a forming mold, by lifting up a portion other than the edge by a lift-up member, and annealing the entire glass sheet including the edge. In this annealing method, since annealing is carried out while the edge is separated from the ring-shaped forming mold, there are merits that it is possible to efficiently cool the edge and to form a sufficient E/C.

Patent Document 2 discloses a laminated glass constituted by component glass sheets each having a plane residual stress changing from a compressive stress to a tensile stress monotonously without having a peak from the edge of the entire periphery toward the inside of the glass sheet. In Patent Document 1, considering that breakage of a glass sheet starts from a portion where a peak of I/T is present, in order to eliminate the peak, the document discloses uniformly cooling the glass sheet without employing a ring-shaped mold.

PRIOR ART DOCUMENTS

Patent Documents

Patent Document 1: JP-B-7-29793
Patent Document 2: JP-A-11-11989

DISCLOSURE OF INVENTION

Technical Problem

In the annealing method of Patent Document 1, since the vicinity of the edge is lifted up, the cooling speed of the region of the glass sheet to be lifted up, that contacts with a lift-up member, is lower than other portions due to the heat capacity of the lift-up member, and accordingly, there has been a risk that I/T becomes large. Further, since a portion of the glass sheet along the edge is lifted up, it has been necessary to prepare a lift-up member dedicated for each shape of glass sheet to be annealed.

In the cooling method described in Patent Document 2, since conveying rollers and a bed etc. each having a predetermined curvature are employed as a glass sheet-conveying means, such a method can be applied only to glass sheets such as door glasses of automobiles having a curvature in one direction.

The present invention has been made under the circumstances, and it is an object of the present invention to provide a method and an apparatus for annealing a glass sheet, which can sufficiently reduce I/T formed in the glass sheet.

Solution to Problem

In order to achieve the above objects, the present invention provides a method for annealing a glass sheet, which is a method for annealing a bent glass sheet, that has a high temperature of at least a strain point and is placed on a ring-shaped forming mold, while the glass sheet is lifted up by a lift-up member and separated from the forming mold; wherein a region including a position that contacts with the lift-up member when the lift-up member lifts up the glass sheet (hereinafter referred to as "region to be lifted up"), that is a region at least 50 mm inside from the edge of the glass sheet, is cooled to a temperature below the strain point before the edge of the glass sheet reaches the strain point, and thereafter, the glass sheet is lifted up by the lift-up member.

Further, the present invention provides a method for annealing a glass sheet, which is a method for annealing a bent glass sheet, that has a high temperature of at least a strain point and is placed on a ring-shaped forming mold, wherein the method includes a step of lifting up the glass sheet by a lift-up member to separate the glass sheet from the forming mold, the region to be lifted up by the lift-up member is a region at least 50 mm inside from the edge of the glass sheet, and the region to be lifted up is cooled to a temperature below the strain point before the edge of the glass sheet reaches the strain point, and thereafter, the glass sheet is lifted up by the lift-up member.

Further, in order to achieve the above objects, the present invention provides an apparatus for annealing a glass sheet comprising a ring-shaped forming mold to which a heated and bent glass sheet is placed, and a lift-up member for lifting up the glass sheet placed on the forming mold to separate the glass sheet from the forming mold; wherein the apparatus comprises a cooling device disposed above or/and below a region including a position that contacts with the lift-up member when the lift-up member lifts up the glass sheet (hereinafter referred to as "region to be lifted up"), that is a region more than 50 mm inside from the edge of the glass sheet, so as to be in proximity with the region.

In the present invention, since a region that has been cooled to a temperature below the strain point by a cooling device is lifted up by a lift-up member, it is possible to lift up a glass sheet from a forming mold without generating a strain.

Further, in the present invention, a position to be lifted up by the lift-up member is set in a region more than 50 mm inside from the edge of the glass sheet, that is, the position is set in a region distant from a peripheral portion (a region within 50 mm inside from the edge) that is a portion wherein a peak of I/T is considered to be present. Accordingly, it is possible to prevent lowering of cooling speed of the peripheral portion due to contact with the lift-up member, and it is possible to reduce I/T. Since the temperature of the edge at this time is at least the strain point, it is possible to make E/C sufficiently high. Here, the region to be lifted up is present in a region other than the peripheral portion of a glass sheet. Typically, it is a region inside from the peripheral portion of a bent glass sheet, and a region including the central region of the glass sheet.

In the present invention, it is preferred that the region to be lifted up is cooled to a temperature below the strain point before the edge of the glass sheet reaches the strain point, and thereafter, the glass sheet is lifted up under the condition that the temperature of a portion 10 mm inside from the edge of the glass sheet is a temperature higher than the strain point of the glass sheet.

In the present invention, it is preferred that the region to be lifted up is locally cooled by a radiation cooling device before it is lifted up.

The cooling device of the present invention is preferably a radiation cooling device for locally cooling the region to be lifted up.

Since the cooling device using radiation cooling has a function of cooling only a predetermined region, the device is suitable as a means for cooling only the region of a glass sheet to be lifted up. Besides this method, there is also a means for cooling the region to be lifted up, by blowing a gas against the region. When the above two means are compared, the cooling means using blowing of a gas has a potential problem that the edge is also cooled by a gas collided with the glass sheet, whereby it is difficult to form a desired temperature distribution, and accordingly, the radiation cooling is preferred.

In the present invention, it is preferred that the temperature of a surface of the radiation cooling apparatus facing to the glass sheet is controlled to be between 300 and 350° C. to cool the glass sheet.

Setting of the temperature of the surface of the radiation cooling device to be between 300 and 350° C. prevents quick cooling and is suitable for appropriate local cooling to a temperature of at most the strain point.

It is preferred that the radiation cooling device comprises a casing having a ventilation flue provided therein and an air supply device for supplying air into the ventilation flue of the casing.

In the present invention, by supplying air from the air supply device to the ventilation flue of the casing and thereby cooling the casing, radiation cooling is possible. Namely, by increasing the emissibility of a surface of the casing facing to a glass, it is possible to promote radiation heat-conduction and thereby to improve cooling efficiency.

Further, it is preferred that the air supply device has a controller for controlling the temperature of the air to be supplied to the ventilation flue to be between 20 and 50° C. By controlling the temperature of the air to be supplied to the ventilation flue of the casing to be between 20 and 50° C., it is possible to control the temperature of a surface of the radiation cooling device facing to the glass sheet to be between 300 and 350° C. in an atmosphere of an annealing stage having a certain temperature.

It is preferred that the casing has a size adapted to be disposed in a region at least 100 mm inside from the edge of the glass sheet, more preferably in a region at least 100 mm inside from the edge of the entire periphery of the glass sheet. In this construction, it is possible to locally radiation-cool only an inner portion more than 50 mm inside from the edge of the glass sheet.

It is preferred that the lift-up member of the present invention is constituted by a member comprising at least three rods, and all of said at least three rods are disposed within a region of the glass sheet-side of the radiation cooling device disposed so as to face to the region of the glass sheet to be lifted up, typically, within a region of an area of 800×1,200 mm. By constituting the lift-up member by the member comprising at least three rods, it is possible to stably lift up the glass sheet. Further, the rods are preferably disposed outside a 300×300 mm region having the same gravity center and the intervals between the rods are preferably at least 300 mm. Further, when the number of rods is three, the rods are preferably disposed so as to form a triangle having a height of at least 300 mm from any of the sides. A lift-up member having such an embodiment can lift up required regions of most of the glass sheets for automotive windshields having different shapes, and it is not necessary to prepare a lift-up member for each model of glass sheet. Here, by making the size of a surface of the casing of the radiation cooling device facing to a glass, to be the same as the region of the arrangement of the rods, it is possible to securely cool the region of the glass sheet to be lifted up.

Further, in the lift-up member, the number of rods may be at least four. In this construction, it is possible to more securely stabilize the glass sheet at a time of lifting up. When the number of rods are at least four, the rods are preferably disposed so as to form a polygonal having a height of at least 300 mm from any of the sides. Further, it is preferred that the leading edge portion of the rod to be in contact with the glass sheet is provided with a cushion member, and that the cushion member is made of a stainless steel cloth, a glass fiber cloth or a heat-resistant cloth composed of any of various types of heat-resistant fibers. By providing the leading edge of each rod with such a cushion member, it is possible to suppress generation of strain on a surface of a glass sheet at a time of lifting up.

In the present invention, it is preferred that two glass sheets are placed on the ring-shaped forming mold so as to be piled up with each other. By annealing two glass sheets, that are to be laminated to constitute a laminated glass, in a state that they are piled up with each other, it is possible to reduce the time required for annealing each laminated glass as compared with annealing the two glass sheets one by one. A forming error at a time of forming the glass sheets one by one causes a gap at a time of laminating the glass sheets, but the gap can be eased.

Advantageous Effects of Invention

As described above, with the method and the apparatus for annealing a glass sheet of the present invention, a region of a glass sheet to be lifted up is cooled to a temperature of at most the strain point by the cooling device. As a result, at a time of lifting up by the lift-up member, it is possible to lift up the glass sheet from a forming mold without generating a strain in a portion of the glass sheet in the region to be lifted up. Further, since a region where I/T is formed is not lifted up, it is also possible to make I/T small. Since the temperature of the edge at this time is at least the strain point, it is possible to form a sufficiently large E/C.

BRIEF DESCRIPTION OF DRAWINGS

FIGS. 1(A) and 1(B) are views of an apparatus for producing a glass sheet for a laminated glass, comprising the apparatus for annealing a glass sheet of the present invention, wherein FIG. 1(A) is a side view schematically showing the apparatus and FIG. 1(B) is a plan view schematically showing the apparatus.

DESCRIPTION OF EMBODIMENTS

Figure 1:
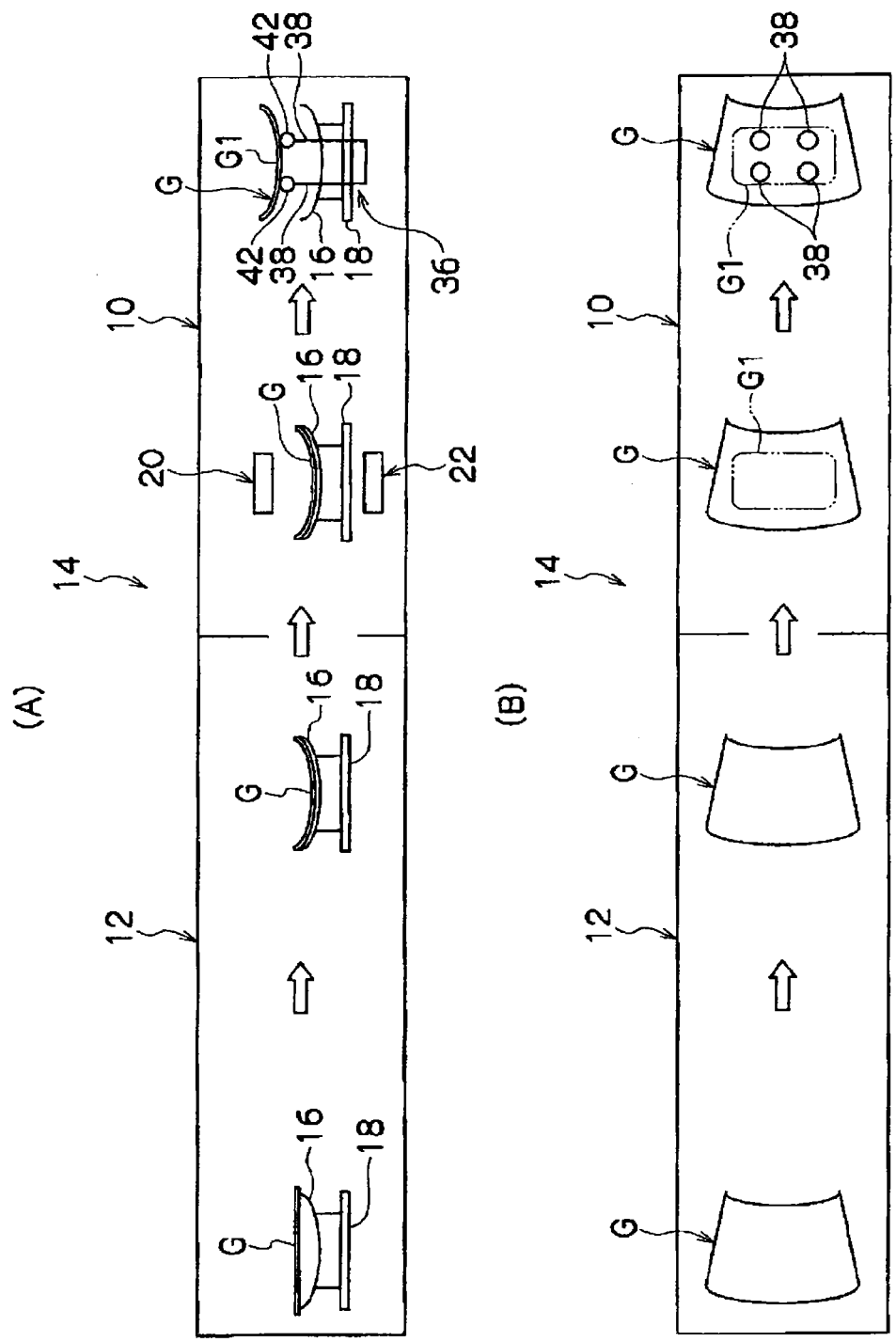

Now, preferred embodiments of the method and the apparatus for annealing a glass sheet according to the present invention will be described with reference to attached drawings.

FIG. 1(A) is a schematic side view of an apparatus 14 for producing a glass sheet for a laminated glass including an annealing furnace 10 provided with the annealing apparatus of the present invention, and a heating furnace 12 provided as a prior stage to the annealing furnace 10. FIG. 1(B) is a schematic plan view of the apparatus 14 for producing a glass sheet for a laminated glass.

A glass sheet G to be produced by the apparatus 14 for producing a glass sheet for a laminated glass, is a windshield for an automobile having a thickness of from 1.3 to 3.0 mm in terms of the thickness of each component glass sheet, but the glass sheet is not limited to a windshield. Namely, the glass sheet G may be a glass sheet such as a windshield having a bent shape of large curvature and having curvatures in a plurality of directions, or it may be a side glass having a bent shape of small curvature and having a curvature in only one direction. The glass sheet G is heated and bent while it passes through the heating furnace 12 in a state that it is placed on a ring-shaped forming mold 16 supporting the edge of the glass sheet G, and thereafter, the glass sheet G is annealed in the annealing apparatus disposed in the annealing furnace 10, to produce a curved glass sheet for a laminated glass.

In more detail, the flat plate-shaped glass sheet G before bending is placed on a forming mold 16 for gravity bending placed on a moving table 18, and conveyed into the heating furnace by a conveying means having an appropriate construction. While the glass sheet G passes through the heating furnace 12, the glass sheet G is heated to a temperature in the vicinity of the softening point (for example, from 580 to 700° C.) by a heater that is not shown. Then, the glass sheet G is softened by the heating and bent by gravity in a state that the edge of the glass sheet G is supported along the curved shape of the forming mold, so as to be bent into a curved shape. By this method, the flat plate-shaped glass sheet G is bent into a glass sheet having a desired curved surface.

The bent glass sheet G is conveyed from the heating furnace 12 into the annealing furnace 10 by the conveying means while the glass sheet G is in a high-temperature state together with the forming mold 16. In the annealing furnace 10, the glass sheet G is subjected to a predetermined annealing treatment by an annealing apparatus. This annealing treatment will be described later. Thereafter, the glass sheet G is conveyed out from the annealing furnace 10 and radiation-cooled. By applying such heating, bending and annealing steps, the flat plate-shaped glass sheet G is processed into a curved glass sheet G for a laminated glass. Here, the forming mold 16 and the moving table 18 are composed of heat-resistant members durable against the glass sheet-forming temperature (580 to 700° C.) in the heating furnace 12. Here, the bending method of the glass sheet G is not limited to the gravity bending, but various known forming methods such as a press molding by pressing a pressing mold against a glass sheet placed on a forming mold, may be employed. In this case, the glass sheet press-molded by the pressing mold is subsequently transferred on a ring-shaped forming mold, and is subjected to the annealing method of the present invention.

In the annealing furnace 10, besides the conveying apparatus for conveying the forming mold 16 on which the glass sheet is placed, an annealing apparatus comprising a pair of cooling devices 20, 22 and a lift-up member 36, is provided.

Figure 2:
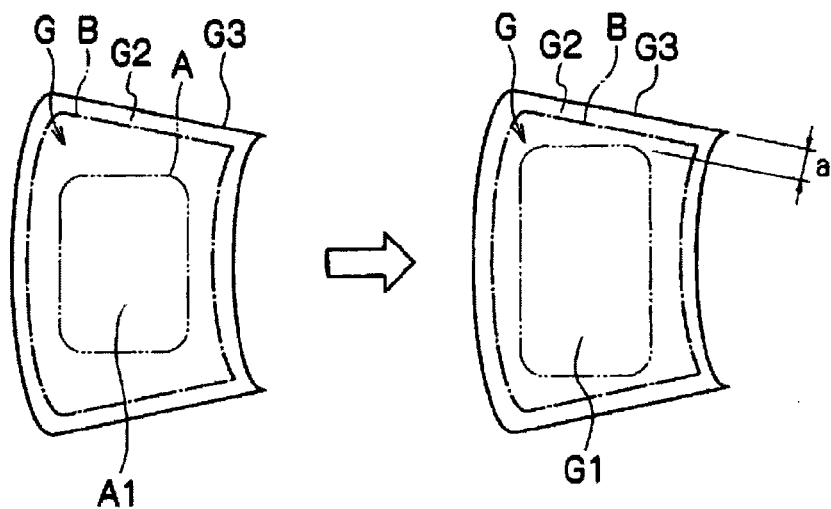
FIG. 2 is a plan view of a glass sheet, which illustrates the temperature changes of the inner portion and the peripheral portion of the glass sheet.

A chain double-dashed line A in the left side glass sheet G in FIG. 2 shows an outer periphery connecting portions to be lifted up by the lift-up member 36, and a region encompassed by the chain double-dashed line A includes a region A1 to be lifted up. Usually, the region A1 to be lifted up is a region including the central region of the glass sheet. Further, G3 shows the edge of the glass sheet G, that is, a side in the periphery of the glass sheet, and a region G2 encompassed by the edge G3 and a chain dashed line B shows a peripheral portion of the glass sheet G. Here, the chain dashed line B is a line connecting portions 10 mm inside from the edge G3 of the glass sheet G. Hereinafter, in this specification, the region G2 of the glass sheet G encompassed by the edge G3 and the chain dashed line B is referred to as a peripheral portion.

A pair of cooling devices 20, 22 are disposed above and below across the glass sheet G, and by these cooling devices 20, 22, the region of the glass sheet G to be lifted up is cooled to a temperature of at most the strain point (for example, 510° C.). More preferably, the region to be lifted up is cooled to a temperature below the strain point (510° C.).

Namely, in the glass sheet G before its surface is cooled by the cooling devices 20, 22, since a portion close to the outer periphery tends to undergo heat dissipation, the region of the left side glass sheet in FIG. 2 encompassed by the chain double-dashed line A including the region to be lifted up is in a high-temperature state as compared with the peripheral region G2. Then, the cooling devices 20, 22 of FIG. 1 locally cool the cooling region G1 encompassed by the chain double-dashed line of the right side glass sheet G in FIG. 2, that is at least equal or wider than the region encompassed by the chain double-dashed line A. By this method, the cooling region G1 is cooled faster than the peripheral portion G2. Namely, when the cooling region G1 is cooled to a temperature of at most the strain point, the peripheral portion G2 is still in a higher-temperature state than the cooling region G1, and at least the temperature of the edge G3 is at least the strain point, and cooling of the edge of the glass sheet G starts from a temperature of at least the strain point. The cooling region G1 is, for example, a region at least "a" (a=50 mm) inside from the edge G3 of the glass sheet, and it indicates a region including the region to be lifted up. In order to more securely delay the cooling of the peripheral portion G2, it is preferred to make the cooling region G1 to be a region of the glass sheet G wherein "a" is at least 100 mm. Further, the glass sheet G shown on the left side of FIG. 2, is a glass sheet G showing a region (region encompassed by the chain double-dashed line A) to be cooled by the cooling devices right after the glass sheet G is conveyed into the annealing furnace 10. The glass sheet G shown on the right side of FIG. 2 is a glass sheet G showing the cooling region G1 just before the glass sheet G is lifted up by the lift-up member 36 to be described later.

Figure 3:
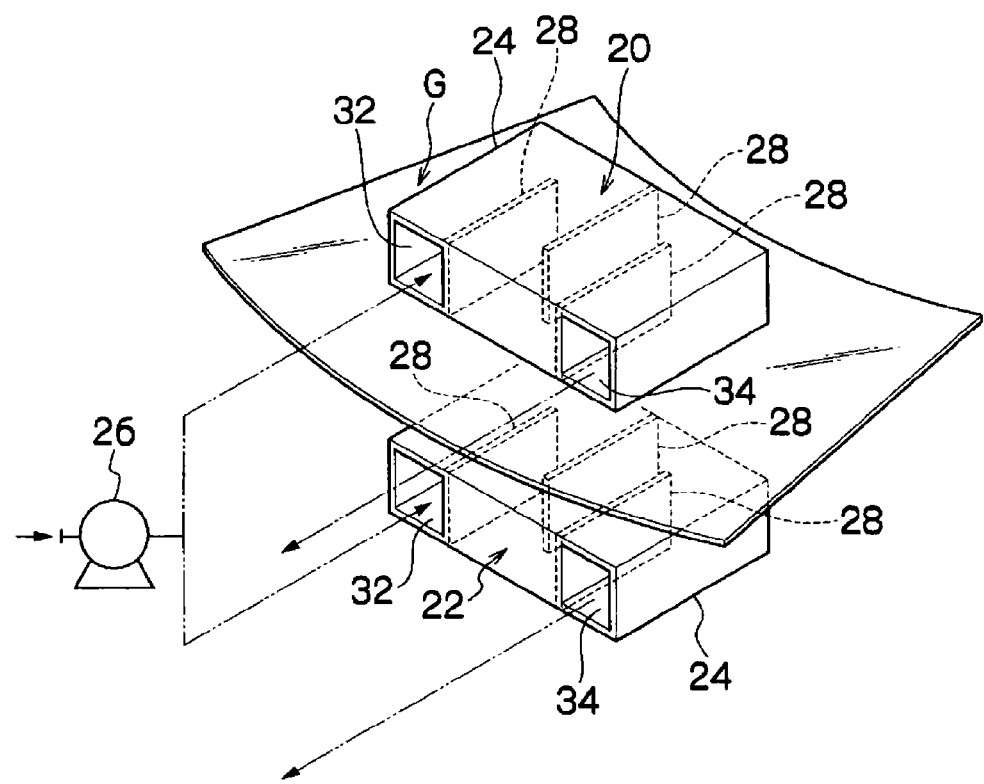
FIG. 3 is a perspective view showing the positional relationship between the glass sheet and a cooling box of a cooling device.

FIG. 3 is a perspective view showing an example of the relationship among the cooling devices 20, 22 and the glass sheet G.

A typical example of the cooling device 20 on the upper side of the figure is constituted by a box-shaped cooling box (casing) 24 made of a metal and a blower (air supply device) 26 for supplying a cooling air to the cooling box 24. The cooling box 24 is disposed above the glass sheet G with a predetermined gap, and is formed in a rectangular solid shape so as to locally cool the cooling region G1 shown in FIG. 2. Here, since the cooling region G1 is not limited to rectangle, the shape of the cooling box 24 is preferably a universal shape so as to correspond to a lift-up member disposed so as to be adapted to various models of glass sheets. By making vertical×horizontal dimensions of the cooling box smaller than 800×1,200 mm, preferably smaller than 400×800 mm, a universal cooling device corresponding to the lift-up member is obtained. Further, this cooling box 24 has a size adapted to be disposed in a region at least 100 mm inside from the edge G3 of the glass sheet G. With this construction, it is possible to locally radiation-cool only a region at least 50 mm inside from the edge G3 of the glass sheet G (that is a region encompassed by the line at least 50 mm inside from the edge of the glass sheet G in the entire periphery of the glass sheet G), that is, a region other than the peripheral portion G2.

In a case of locally cooling the cooling region G1 shown in FIG. 2, the shape of the cooling box 24 in plan view has a slightly smaller similar shape of the cooling region G1. Further, the size is determined according to the distance between the cooling box 24 and the glass sheet G. Then, the cooling box 24 is disposed so that the gravity centers of the cooling box and the glass sheet agree to each other in plan view.

By controlling the surface temperature of the cooling box 24 (a surface facing to the glass sheet G) to be between 300 and 350° C., the cooling region G1 is radiation-cooled. By this method, it is possible to efficiently cool the cooling region G1 of the glass sheet G to a temperature of at most the strain point.

Further, inside the cooling box 24, three partition plates 28, 28, 28 are disposed in a staggered form, whereby a meander-shaped ventilation flue 30 is formed in the entire region inside the cooling box 24. Further, on one side of the cooling box, an entrance 32 communicating with one end of the ventilation flue 30 is provided, and an exit 34 communicating with the other end of the ventilation flue 30 is provided. The entrance 32 communicates with a blower 26 via a duct not shown, and the exit 34 communicates with an exhaust duct, not shown.

The blower 26 supplies an external air or a cooling air whose temperature is controlled between 20 and 50° C. by a controller, not shown, to the entrance 32 via the duct. The supplied air cools the cooling box 24 while the air passes through the ventilation flue 30. Accordingly, a heat exchange takes place between the air and the cooling box 24 heated by the radiation heat from the glass sheet G, and as a result, the air having a temperature of from 250 to 300° C. is exhausted from the exit 34. The exhausted air flows through the exhaust duct and is exhausted to the outside the annealing furnace 10. Thus, since the cooling box 24 is cooled by the cooling air, it is possible to control the surface temperature of the cooling box 24 to be between 300 and 350° C.

The cooling device 22 in the lower position in the figure has the same construction as the cooling device 20 in the upper position, and the same symbols as those of the cooling device 20 are applied and the explanation of the cooing device 22 is omitted. Here, it is not essential that both of the upper and lower cooling devices are required, and the cooling may be conducted by either one of the cooling devices. As described above, only the cooling region G1 of the glass sheet G is cooled to a temperature of at most the strain point by the cooling devices 20, 22.

Here, the cooling devices 20, 22 of this embodiment have a function of cooling the cooling region G1 of the glass sheet G by radiation cooling, but they may be devices for cooling the cooling region G1 by blowing a gas against the cooling region G1. However, such a cooling method of blowing a gas may cause a problem that the gas collided with the glass sheet G also cools the peripheral portion G2 and the edge G3, whereby it is difficult to control the stress distribution formed in the glass sheet G. Accordingly, like the embodiment, cooling devices 20, 22 for cooling by employing radiation heat are preferred.

Figure 4:
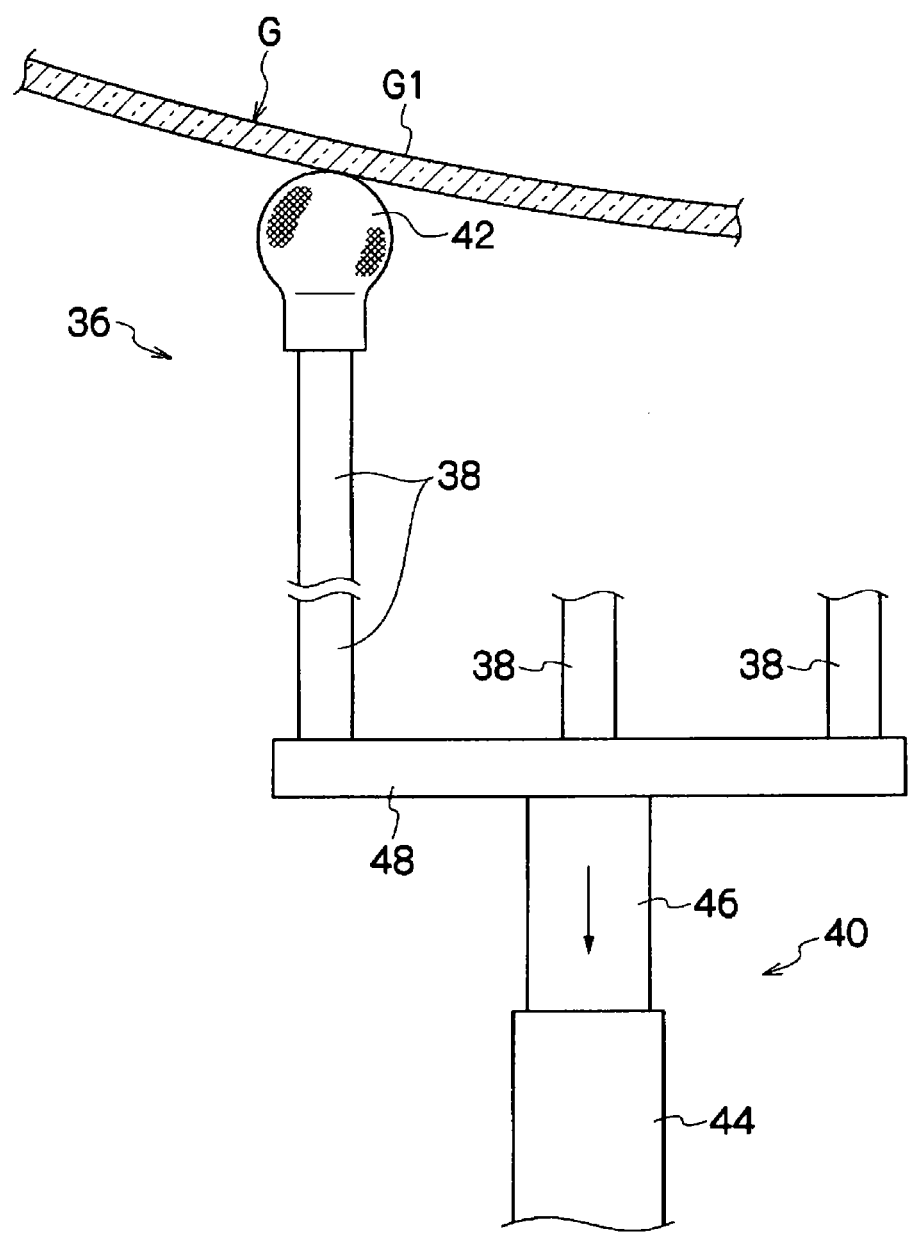
FIG. 4 is a side view showing the substantial part of a lift-up member.

In the glass sheet G wherein only the cooling region G1 has been cooled to a temperature of at most the strain point, the cooling region G1 is lifted up by a lift-up member 36 shown in FIGS. 1 and 4. The glass sheet G is annealed for a predetermined time in this state.

FIG. 4 is a side view showing a substantial part of the lift-up member 36.

The lift-up member 36 is constituted by three or four rods 38, 38 . . . and a cylinder mechanism 40 for moving up and down the rods 38, 38 . . . simultaneously. The upper end portion of each rod 38 is provided with a cushion member 42 to contact with a lower surface of the glass sheet G. The cushion member 42 is made of a heat-resistant cloth such as a stainless steel cloth, a glass fiber cloth or a cloth made of various types of heat-resistant fibers.

As shown in FIG. 4, the cylinder mechanism 40 is provided with a cylinder 44 and a piston 46, a frame 48 is connected to the upper end portion of the piston 46, and lower portions of the rods 38, 38 . . . are fixed to the upper surface of the frame 48. Accordingly, when the piston 46 of the cylinder 44 stretches, the rods 38, 38 . . . move up, and the cushion members 42, 42 . . . come into contact with the region encompassed by the chain double-dashed line A on the lower surface of the glass sheet G. Then, by the subsequent stretch movement of the piston 46, the glass sheet G is lifted up and the entire glass sheet G is separated upwardly from the forming mold 16. The glass sheet G is annealed in this state. Here, the cylinder mechanism 40 is an example, and the rods 38, 38 . . . may be moved up by a known means such as a servo motor.

Further, in the case shown in FIG. 2, four rods 38, 38 . . . are disposed at respective corners of a rectangle encompassed by the chain double-dashed line A. Further, the rectangle encompassed by the chain double-dashed line A is at most 800×1, 200 mm, and at least 300×300 mm (not shown) having a common gravity weight. In such an embodiment, in a case of a glass sheet for a normal automotive windshield, the lift-up member is universally applicable and can stably lift up the glass sheet.

The lift-up member 36 is preferably disposed so that it can move in and out through an opening provided through a furnace floor of the annealing furnace 10, but as the case requires, the lift-up member can be provided integrally with the moving table 16.

As described above, in the annealing method of a glass sheet G of this embodiment, in a state that the glass sheet G heated to a temperature of at least the strain point is bent and placed on a forming mold 16, first, the cooling region G1 of the glass sheet G is cooled by the cooling devices 20, 22, to make only the cooling region G1 to be in a temperature state of at most the strain point while the temperature of the edge G3 is maintained to be at least the strain point. Subsequently, in this state, the lift-up member 36 is operated to lift up the cooling region G1 of the glass sheet G by the rods 38, 38 . . . to separate the glass sheet G from the forming mold 16, and in this state, they are moved through the annealing furnace to anneal the glass sheet G. Here, the state that the glass sheet is lifted up from the forming mold 16 may be terminated when the temperature of the edge of the glass sheet G becomes a temperature of at most the strain point −10° C.

By such a cooling of the cooing region G1, it is possible to lift up the glass sheet from the forming mold 16 without generating a strain in the glass sheet G (that is, in the lifting-up region). Since the region to be lifted up by the lift-up member 36 is set in a region at least 50 mm inside from the edge G3 of the glass sheet G, that is, since the region to be lifted up is set in a region inside from the peripheral portion where the peak of UT is present, it is possible to prevent lowering of cooing speed of the peripheral portion, whereby it is possible to reduce I/T in the peripheral portion and to form a sufficiently large E/C.

Further, the cooling region G1 is substantially quadrangular, but the shape may be appropriately changed according to the region to be lifted up. For example, in a case of lifting up by three rods, the cooling region G1 may be substantially triangular. Even in a case of lifting up by four rods like the figure, the cooling region G1 may be provided in each of four regions contacting the glass sheet to cool the regions.

During annealing of a glass sheet G, by making the cooling speed of the peripheral portion G2 slower than that of the cooling region G1, the temperature of the peripheral portion G2 can be maintained to be a high temperature. The edge G3 is cooled faster than the peripheral portion G2. In this process, when the temperature of the edge G3 is the annealing point +20° C. (for example, 570° C.), the temperature of the edge G3 is preferably at least 3° C. lower than the temperature of a portion inside from the edge (that is, a portion 10 mm inside from the edge). Such a temperature control can be achieved, for example, by moving the glass sheet from the forming furnace to the annealing furnace and thereby cooling the edge G3. As an alternative, such a temperature control can be achieved by controlling the temperature of the atmosphere in the annealing furnace. By forming a predetermined temperature difference between the edge G3 and a portion inside from the edge (that is a portion corresponding to 10 mm inside from the edge, and that is a portion corresponding to the line B2 in FIG. 2) before their temperatures drop to the annealing point, it is possible to expect a sufficient relaxation of stress. Here, the temperature of the edge G3 of the glass sheet G means the temperature of the outermost layer (that is the end portion indicated by G3) of the glass sheet G.

Further, when the temperature of the edge G3 is the strain point (for example, 510° C.), it is preferred to form a state that the temperature of the edge G3 is at least 8° C. lower than the temperature inside from the edge. This state is preferred regardless of before or after lifting up by the lift-up member 36. When the temperature difference between the edge G3 and the inside from the edge (10 mm) is at least 8° C. when the temperature of the edge G3 is at the strain point, a high E/C can be obtained.

It is more preferred to form a state that the temperature of the edge G3 is at least 8° C. lower than the temperature inside from the edge when the temperature of the edge is at the annealing point (for example, 550° C.). By this method, it is possible to form a high stress distribution of E/C more securely.

Further, it is preferred to lift up the glass sheet G by the lift-up member 36 when the temperature of the edge G3 is higher than the strain point −10° C. (for example, 500° C.). This is because in order to obtain a predetermined stress distribution, it is considered to be necessary to maintain a state that the temperature of the edge G3 is at least 8° C. lower than the temperature inside (10 mm from the edge) for a few seconds to tens of seconds before the temperature of the edge G3 reaches the strain point or before the temperature reaches the strain point −10° C. Here, there is an effect that by lifting up the glass sheet G when the temperature of the edge G3 is higher than the strain point, it is easy to produce a temperature difference when the edge G3 reaches the strain point.

More preferably, the glass sheet G is lifted up when the temperature of the edge G3 is a temperature higher than the annealing point (for example, 550° C.). By this method, it is possible to produce a temperature difference of at least 8° C. between the edge G3 and the inside (10 mm) from the edge more securely when the edge G3 reaches the annealing point.

The purpose of lifting up the glass sheet by the lift-up member is to produce a temperature difference of at least 8° C. between the edge G3 and the inside (10 mm) from the edge before the edge G3 reaches the strain point, by cooling the edge G3 by the lifting up in a case where the temperature difference between the edge G3 and the inside (10 mm) from the edge is less than 8° C. before the lifting up. Without lifting up the glass sheet, since the heat capacity of the forming mold 16 is large and the temperature of the forming mold 16 does not easily drop, cooling of the edge in contact with the forming mold 16 becomes slow, whereby the temperature difference between the edge G3 and the inside (10 mm) from the edge does not become at least 8° C.

Further, since the temperature of the atmosphere in the annealing zone is low, at the instant of entry of the glass sheet into the annealing zone, the temperature difference between the edge G3 and the inside (10 mm) from the edge tends to be formed, and the temperature difference between the edge G3 and the inside (10 mm) from the edge becomes already at least 8° C. before lifting up the glass sheet in some cases. In such cases, it is necessary to maintain the temperature difference between the edge G3 and the inside (10 mm) from the edge by the lifting up until the edge G3 reaches the strain point. Without lifting up, since the temperature of the forming mold does not easily drop, the temperature of the edge G3 in contact with the forming mold 16 also does not easily drop, whereby the temperature difference from the inside (10 mm) from the edge becomes small.

More preferably, the glass sheet G is annealed after it is heated to a temperature of at least the annealing point +32° C. (for example, 582° C.). By forming such a high-temperature state, it is possible to securely relax the stress.

Here, in the embodiment, the described annealing point and strain point are those of soda lime glass as an example, but they are appropriately changed depending on the composition of glass. Further, in this embodiment, bending is carried out in a state that a single glass sheet G is placed on the ring-shaped forming mold 16 and heated, but the bending may be carried out by gravity in a state that two glass sheets are placed on a forming mold 16 as they are piled up and heated.

Conditions in the case of placing two glass sheets on the forming mold 16 in a state that they are piled up with each other and heating them to bend the glass sheets by gravity, may be selected in the same manner as the conditions in the above case of placing a single glass sheet G on the ring-shaped forming mold 16 and heating the glass sheet to bend the glass sheet.

Here, in a case of lifting up a region to be lifted up of two glass sheets placed on a forming mold in a state that they are piled up, by a lift-up member, it is necessary that the region to be lifted up of a glass sheet that contacts with the lift-up member, that is an underside glass sheet, is cooled to a temperature below the strain point before the edge of the glass sheet reaches the strain point, and thereafter, the glass sheets are lifted up by the lift-up member. Among the two placed glass sheets, the region of the upper glass sheet to be lifted up is also preferably cooled to a temperature below the strain point before the edge of the glass sheet reaches the strain point and before the lift-up member contacts with the region. However, the region of the upper glass sheet to be lifted up is not necessarily cooled to a temperature below the strain point before the edge of the glass sheet reaches the strain point and before the lift-up member contacts with the region.

Further, in this embodiment, the glass sheet G is placed on the forming mold 16 and heated to bend the glass sheet by gravity, but the glass sheet may be pressed to be bent by a press means after the glass sheet is heated and placed on the forming mold.

EXAMPLES

In a bending apparatus 14 shown in FIG. 1, two glass sheets each having a thickness of 2 mm are placed on a forming mold 16 in a state that they are piled up via a separating powder and that the edge of the glass sheet is supported by the forming mold 16, they were moved to pass through a heating furnace 12 to bend the glass sheets. Subsequently, the shaped glass sheets were conveyed into an annealing furnace 10, and as shown in FIG. 3, the cooling region of the glass sheet G was cooled by cooling devices 20, 22. Next, a lift-up member 36 was operated to lift up the cooling region G1 of the glass sheet G by the rods 38 shown in FIG. 4, to separate the glass sheet G from the forming mold 16 to cool the glass sheet G. By this method, the shaped glass sheets were annealed under three cooling conditions of Examples 1 to 3 shown in Table 1. The annealing point of the glass sheets was 550° C., their strain point was 510° C. Examples 1 to 3 are Examples of the present invention and Examples 4 and 5 are Comparative examples. Example 4 is an example of annealing glass sheets without using the cooling devices 20, 22 and lifting up the glass sheets at a temperature higher than the strain point, and Example 5 is an example of carrying out no lifting up. Conditions of Examples 4 and 5 are as shown in Table 1.

Temperature histories in these Examples are shown in FIGS. 5 to 14. In each of graphs shown in FIGS. 5, 7, 9, 11 and 13, the vertical axis represents the temperature history at the edge G3 and the center (included in the cooling region G1) of the glass sheet, and the horizontal axis represents the lapse of temperature measurement time of the glass sheet (lapse of time from the start of heating of the glass sheet). Here, the timing of start of temperature measurement does not have a specific meaning, and the timings of these Examples do not agree with one another. Further, in each of the graphs shown in FIGS. 6, 8, 10, 12 and 14, the vertical axis represents the temperature difference between the edge G3 of the glass sheet and the inside (10 mm inside from the edge), and the horizontal axis represents the lapse of time of temperature measurement of the glass sheet.

TABLE 1

|  |  | Annealing point + 20° C. | Lifting-up time | Strain point |
|---|---|---|---|---|
| Ex. 1 | Timing [sec] | 456-459 | 567 | 591 |
|  | Edge [° C.] | 570.0 | 542 | 510.0 |
|  | Inside from edge [° C.] | 574.5-576.0 | 545.5 | 520.5 |
|  | Temperature difference [° C.] | 4.5-6.0 | 3.5 | 10.5 |
| Ex. 2 | Timing [sec] | 475-476 | 543 | 555 |
|  | Edge [° C.] | 569.5-570.5 | 537.5 | 510.0 |
|  | Inside from edge [° C.] | 575.5-576.0 | 553.5 | 525.5 |
|  | Temperature difference [° C.] | 5.0-6.5 | 16.0 | 15.5 |
| Ex. 3 | Timing [sec] | 605-606 | 618 | 621-622 |
|  | Edge [° C.] | 567.0-571.5 | 518.5 | 511.0-509.0 |
|  | Inside from edge [° C.] | 572.5-575.5 | 542.5 | 535.5-533.5 |
|  | Temperature difference [° C.] | 4.0-5.5 | 24.0 | 24.5 |
| Ex. 4 | Timing [sec] | 344-345 | 356 | 371 |
|  | Edge [° C.] | 566.5-572.0 | 531.5 | 511.0 |
|  | Inside from edge [° C.] | 580.0-582.0 | 558.5 | 527.0 |
|  | Temperature difference [° C.] | 10.0-13.5 | 27.0 | 16.0 |
| Ex. 5 | Timing [sec] | 454-456 | — | 577 |
|  | Edge [° C.] | 570.0 | — | 510.0 |
|  | Inside from edge [° C.] | 575.0-575.5 | — | 516.0 |
|  | Temperature difference [° C.] | 5.0-5.5 | — | 6.0 |

In Table 1, "annealing point+20° C." means that the edge temperature of a glass sheet is annealing point+20° C., that is the condition of 570° C. in the Examples, and "lifting-up time" is a condition when the glass sheet was lifted up by the lift-up member. "Strain point" is a condition when the edge temperature of the glass sheet is the strain point, that is 510° C. in the Examples. "Timing" means a lapse of time after start of temperature measurement in each case, "edge" represents the temperature of the edge G3, "inside from edge" represents the temperature at 10 mm inside from the edge G3 (portion corresponding to line B). "Temperature difference" represents the temperature difference between "edge" and "inside from edge".

Further, Table 2 shows the results of generation of strain and stress distribution when the glass sheets were annealed under the above conditions.

TABLE 2

|  | Center temperature at a time of lifting-up [° C.] | Generation of strain | E/C [MPa] | I/T [MPa] |
|---|---|---|---|---|
| Ex. 1 | 473 | No | 12.2 | 0.5 |
| Ex. 2 | 495 | No | 10.8 | 1.1 |
| Ex. 3 | 484.0 | No | 17.0 | 1.8 |
| Ex. 4 | 606.1 | Exist | 11.1 | 1.9 |
| Ex. 5 | — | No | 3.4 | 1.1 |

Figure 5:
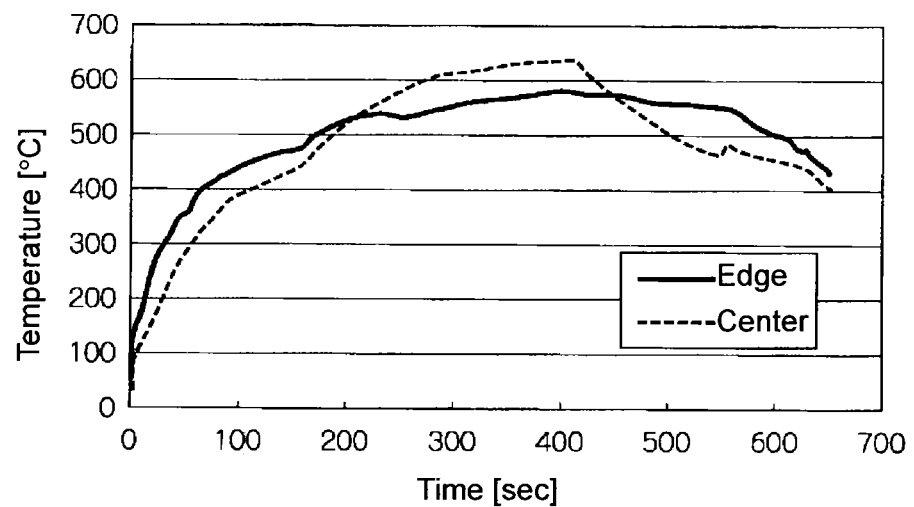
FIG. 5 is a graph of Example 1 showing the temperature histories of the edge of the glass sheet and a cooling region with respect to a lapse of temperature measurement time of the glass sheet.
Figure 6:
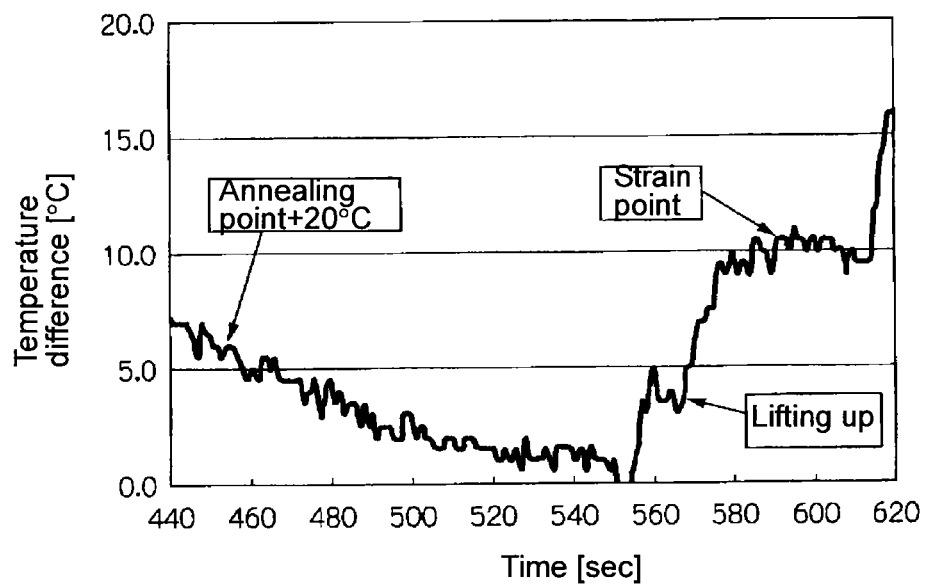
FIG. 6 is a graph of Example 1 showing the temperature difference between the edge of a glass sheet and a position 10 mm inside from the edge with respect to lapse of temperature measurement time of the glass sheet.
Figure 7:
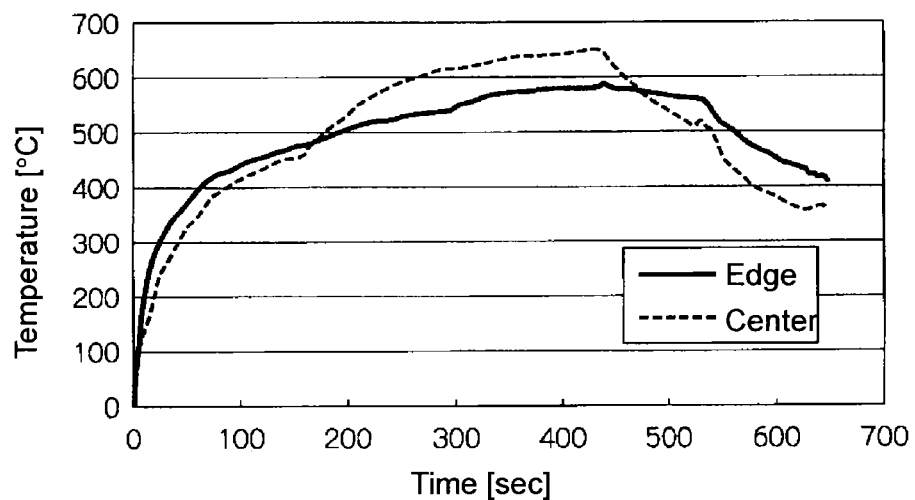
FIG. 7 is a graph of Example 2 showing the temperature histories of the edge of the glass sheet and a cooling region with respect to a lapse of temperature measurement time of the glass sheet.
Figure 8:
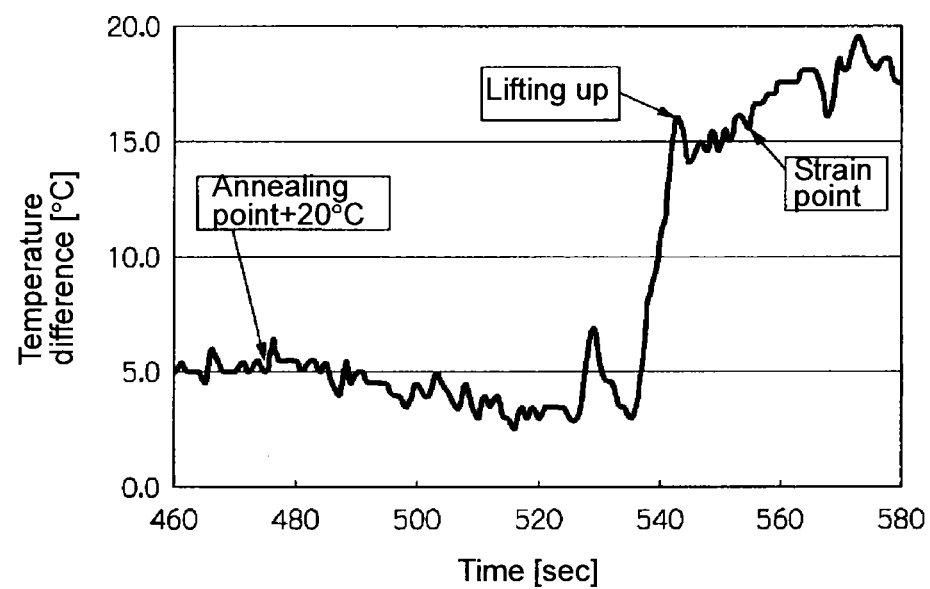
FIG. 8 is a graph of Example 2 showing the temperature difference between the edge of a glass sheet and a position 10 mm inside from the edge with respect to lapse of temperature measurement time of the glass sheet.
Figure 9:
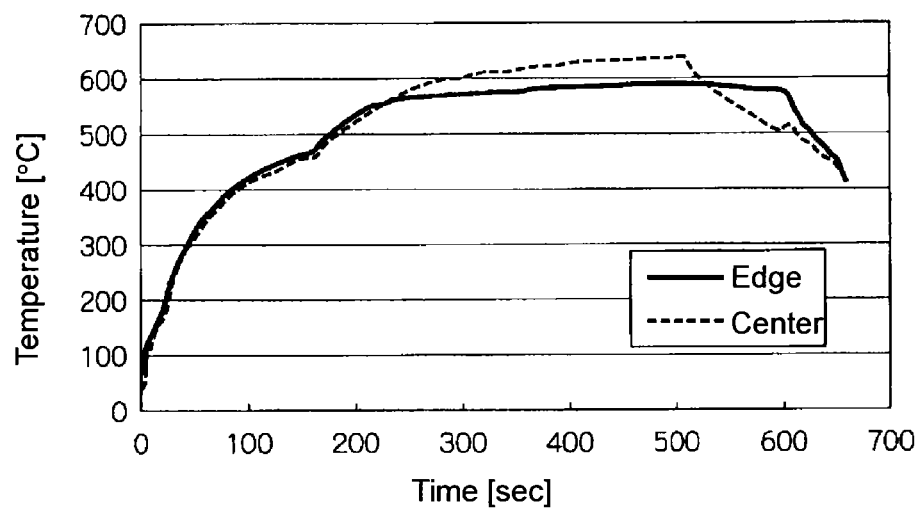
FIG. 9 is a graph of Example 3 showing the temperature histories of the edge of the glass sheet and a cooling region with respect to a lapse of temperature measurement time of the glass sheet.
Figure 10:
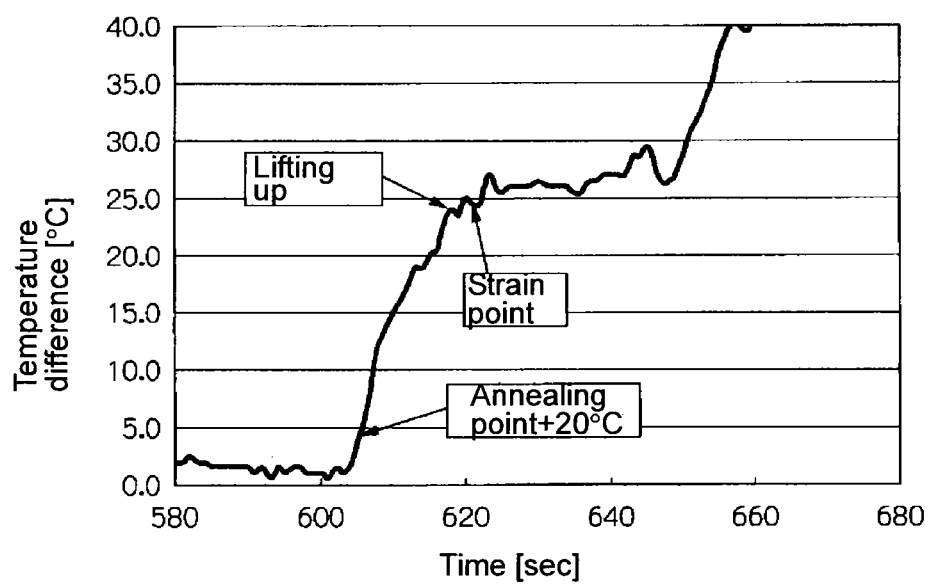
FIG. 10 is a graph of Example 3 showing the temperature difference between the edge of a glass sheet and a position 10 mm inside from the edge with respect to lapse of temperature measurement time of the glass sheet.
Figure 11:
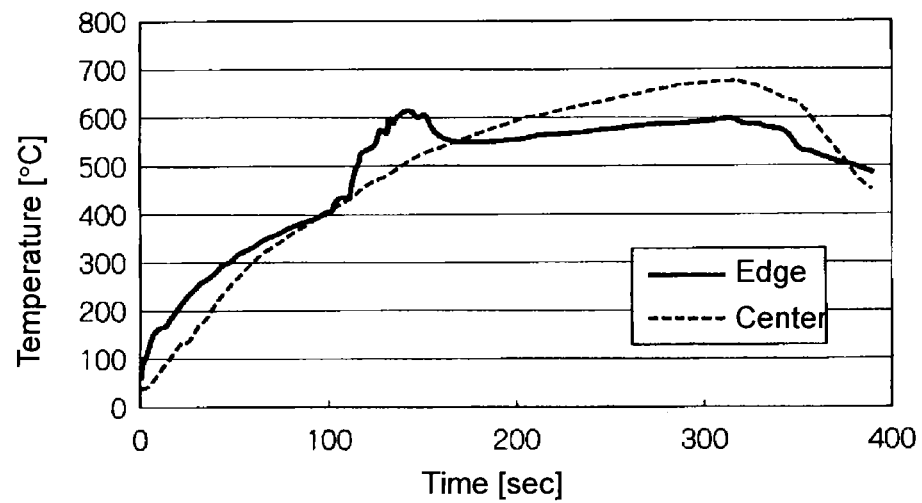
FIG. 11 is a graph of Example 4 showing the temperature histories of the edge of the glass sheet and a cooling region with respect to a lapse of temperature measurement time of the glass sheet.
Figure 12:
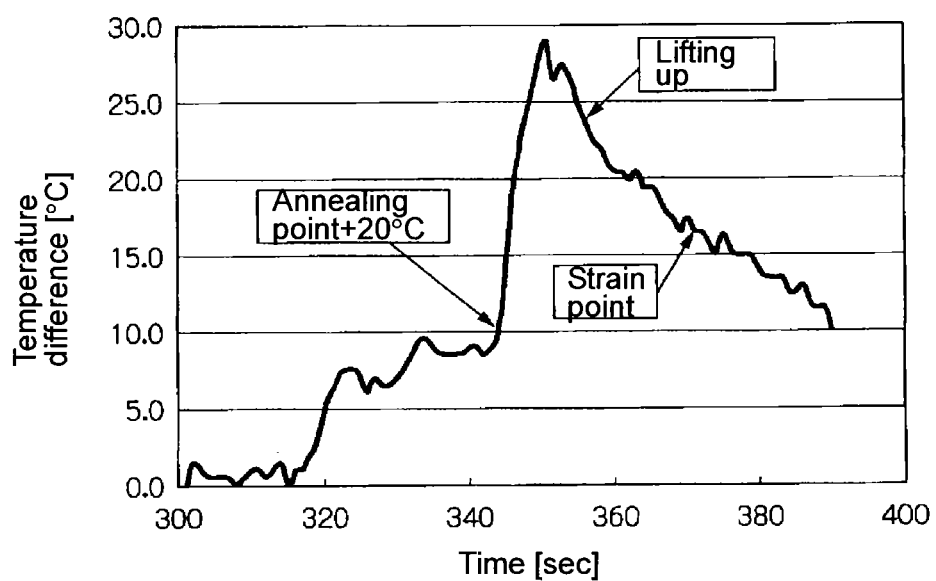
FIG. 12 is a graph of Example 4 showing the temperature difference between the edge of a glass sheet and a position 10 mm inside from the edge with respect to lapse of temperature measurement time of the glass sheet.
Figure 13:
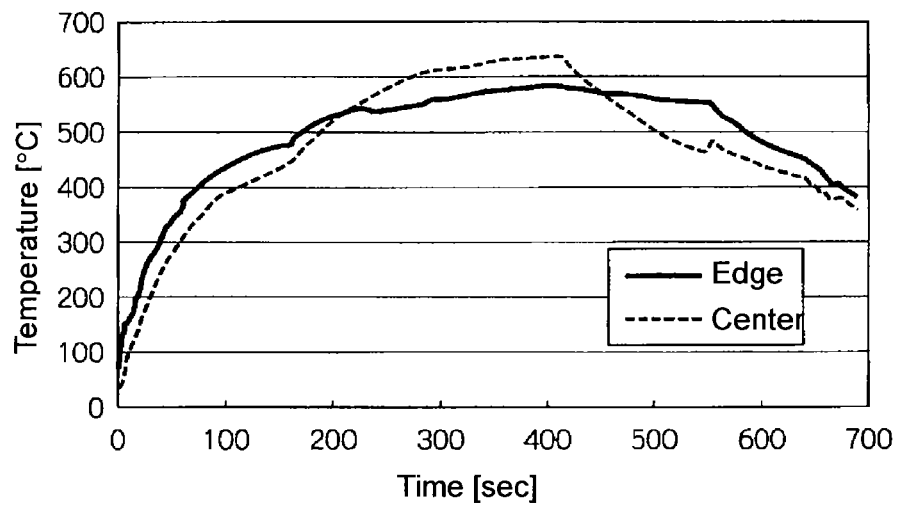
FIG. 13 is a graph of Example 5 showing the temperature histories of the edge of the glass sheet and a cooling region with respect to a lapse of temperature measurement time of the glass sheet.
Figure 14:
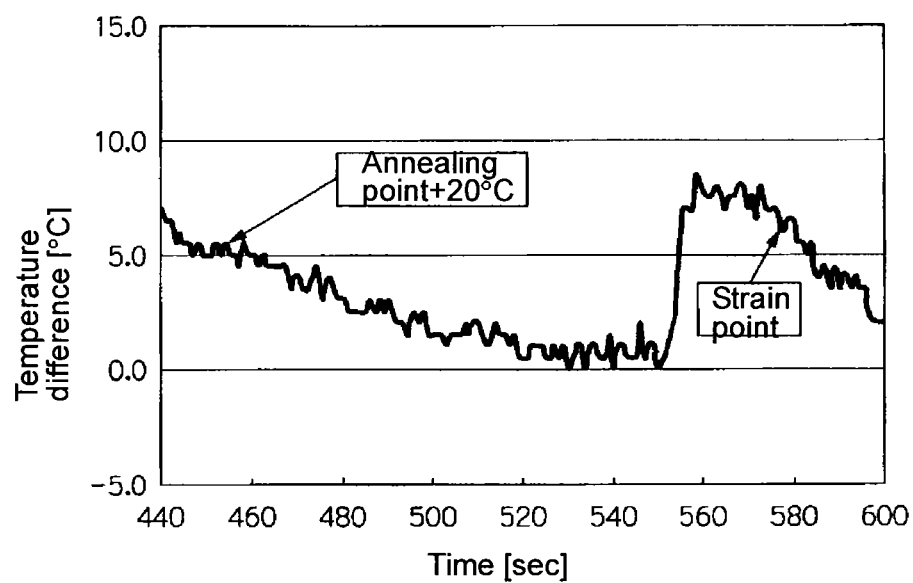
FIG. 14 is a graph of Example 5 showing the temperature difference between the edge of a glass sheet and a position 10 mm inside from the edge with respect to lapse of temperature measurement time of the glass sheet.

In FIGS. 5, 7 and 9, the temperatures of the edge G3 and the center were inverted by cooling produced by the cooling box 24 before the glass sheet was lifted up, and as shown in Table 2, the temperature of the center at a time of lifting up was below the strain point. On the other hand, in Example 4, since the cooling devices 22, 24 were not employed, the temperatures of the edge G3 and the center were not inverted at the time of lifting up as shown in FIG. 11. Further, since the temperature of the cooling region G1 was at least the strain point, a large strain was generated in the lifted-up portion.

Further, the stress distributions were as shown in Table 2, and in Examples 1 to 3. It was possible to form sufficient E/C in the glass sheet and to make I/T small. On the other hand, in Example 5, since the glass sheet was not lifted up, it was not possible to produce a temperature difference of at least 8° C. between the edge G3 and the inside (10 mm) from the edge at the time of strain point, and accordingly, it was not possible to form a sufficient E/C.

INDUSTRIAL APPLICABILITY

With the present invention, before a region at least 50 mm inside from the edge of a high-temperature glass sheet bent and placed on a ring-shaped forming mold, is lifted up by a lift-up member, a region of the glass sheet to be lifted up is cooled to a temperature of at most the strain point, whereby strain is not generated in the portion in the region of the glass sheet to be lifted up. Further, the region right inside from the edge of the glass sheet wherein a plane compressive stress (that is I/T) is formed is not lifted up, it is possible to make the value of I/T small. Further, by making the temperature of the edge of the glass sheet at the time of lifting up the glass sheet to be at most the strain point, it is possible to increase the value of E/C formed in the edge of the glass sheet, and to obtain a glass sheet having a high edge strength. A glass sheet produced by the present invention is suitable as a component glass sheet to be employed for producing a laminated glass, and by employing such a component glass sheet to produce a laminated glass, it is possible to obtain a laminated glass having a high edge strength and a low I/T, and accordingly, such a glass is useful as a laminated glass for automobiles and other vehicles.

This application is a continuation of PCT Application No. PCT/JP2011/052173, filed Feb. 2, 2011, which is based upon and claims the benefit of priority from Japanese Patent Application No. 2010-022120 filed on Feb. 3, 2010. The contents of those applications are incorporated herein by reference in its entirety.

REFERENCE SYMBOLS

10 . . . annealing furnace, 12 . . . heating furnace, 14 . . . apparatus for producing glass sheet for laminated glass, 16 . . . forming mold, 18 . . . moving table, 20 . . . cooling device, 22 . . . cooling device, 24 . . . cooling box, 26 . . . blower, 28 . . . partition plate, 30 . . . ventilation flue, 32 . . . entrance, 34 . . . exit, 36 . . . lift-up member, 38 . . . rod, 40 . . . cylinder mechanism, 42 . . . cushion member, 44 . . . cylinder, 46 . . . piston, 48 . . . frame

What is claimed is:

1. A method for annealing a glass sheet, comprising:
   annealing a bent glass sheet that has a high temperature of greater than a strain point and which is supported on a ring-shaped forming mold, while the bent glass sheet is lifted up by a lift-up member and separated from the forming mold; and
   lifting up the bent glass sheet with said lift-up member at a region to be lifted which includes a position on the bent glass sheet that contacts with the lift-up member when the lift-up member lifts up the glass sheet, and is a region at least 50 mm inside from an edge of the glass sheet, wherein during said annealing the region to be lifted up is cooled to a temperature below the strain point before the edge of the glass sheet reaches the strain point, and thereafter, the glass sheet is lifted up by the lift-up member.

2. A method for annealing a glass sheet, comprising:
annealing a bent glass sheet that has a high temperature of greater than a strain point and which is supported on a ring-shaped forming mold; and
lifting up the glass sheet by a lift-up member to separate the glass sheet from the forming mold, wherein:
the region to be lifted up by the lift-up member is a region at least 50 mm inside from an edge of the glass sheet, and
during said annealing the region to be lifted up is cooled to a temperature below the strain point before the edge of the glass sheet reaches the strain point, and thereafter, the glass sheet is lifted up by the lift-up member.

3. The method for annealing a glass sheet according to claim 1, wherein the region to be lifted up is cooled to a temperature below the strain point before the edge of the glass sheet reaches the strain point, and thereafter, the glass sheet is lifted up under the condition that the temperature of a portion 10 mm inside from the edge of the glass sheet is a temperature higher than the strain point −10° C. of the glass sheet.

4. The method for annealing a glass sheet according to claim 2, wherein the region to be lifted up is cooled to a temperature below the strain point before the edge of the glass sheet reaches the strain point, and thereafter, the glass sheet is lifted up under the condition that the temperature of a portion 10 mm inside from the edge of the glass sheet is a temperature higher than the strain point −10° C. of the glass sheet.

5. The method for annealing a glass sheet according to claim 1, wherein the region to be lifted up is locally cooled by a radiation cooling device.

6. The method for annealing a glass sheet according to claim 2, wherein the region to be lifted up is locally cooled by a radiation cooling device.

7. The method for annealing a glass sheet according to claim 5, wherein the temperature of a surface of the radiation cooling device facing to the glass sheet is controlled to be between 300 and 350° C. to cool the glass sheet.

8. The method for annealing a glass sheet according to claim 6, wherein the temperature of a surface of the radiation cooling device facing to the glass sheet is controlled to be between 300 and 350° C. to cool the glass sheet.

9. The method for annealing a glass sheet according to claim 1, wherein two piled up glass sheets are placed on the ring-shaped forming mold.

10. The method for annealing a glass sheet according to claim 2, wherein two piled up glass sheets are placed on the ring-shaped forming mold.

11. The method according to claim 1, wherein the glass sheet is annealed in an annealing apparatus disposed in an annealing furnace.

12. The method according to claim 1 wherein the glass sheet is a laminated glass.

* * * * *